US010740169B1

United States Patent
Passaretti et al.

(10) Patent No.: US 10,740,169 B1
(45) Date of Patent: Aug. 11, 2020

(54) SELF-LEARNING TROUBLESHOOTER

(71) Applicant: CSC Holdings, LLC, Bethpage, NY (US)

(72) Inventors: Christopher F. Passaretti, Smithtown, NY (US); Raymond Scott Johnson, West Babylon, NY (US)

(73) Assignee: CSC Holdings, LLC, Bethpage, NY (US)

( * ) Notice: Subject to any disclaimer, the term of this patent is extended or adjusted under 35 U.S.C. 154(b) by 253 days.

(21) Appl. No.: 15/989,763

(22) Filed: May 25, 2018

Related U.S. Application Data

(60) Provisional application No. 62/511,200, filed on May 25, 2017.

(51) Int. Cl.
| | |
|---|---|
| *G06F 11/07* | (2006.01) |
| *H04L 29/08* | (2006.01) |
| *G06F 3/0484* | (2013.01) |
| *G06F 11/36* | (2006.01) |
| *H04L 12/28* | (2006.01) |

(52) U.S. Cl.
CPC .......... *G06F 11/079* (2013.01); *G06F 3/0484* (2013.01); *G06F 11/0709* (2013.01); *G06F 11/0751* (2013.01); *G06F 11/0775* (2013.01); *G06F 11/3684* (2013.01); *H04L 12/2823* (2013.01); *H04L 67/10* (2013.01)

(58) Field of Classification Search
CPC ............. G06F 11/0748; G06F 11/3495; G06F 11/0793; G06F 11/2257; G06F 11/3684; G06F 11/3688; G06F 3/0484; H04L 67/10; H04L 12/2823
See application file for complete search history.

(56) References Cited

U.S. PATENT DOCUMENTS

| | | | |
|---|---|---|---|
| 7,191,364 B2 * | 3/2007 | Hudson | G06F 11/0748 707/999.202 |
| 2008/0288432 A1 * | 11/2008 | Malik | H04W 24/08 706/47 |
| 2014/0280068 A1 * | 9/2014 | Dhoopar | G06F 11/079 707/722 |
| 2017/0024662 A1 * | 1/2017 | Warn | G06N 3/0445 |
| 2017/0235848 A1 * | 8/2017 | Van Dusen | G06Q 50/01 705/12 |
| 2018/0324204 A1 * | 11/2018 | McClory | G06F 8/71 |

* cited by examiner

*Primary Examiner* — Jigar P Patel
(74) *Attorney, Agent, or Firm* — Sterne, Kessler, Goldstein & Fox P.L.L.C.

(57) ABSTRACT

A method, system, and computer program product to troubleshoot a problem with a device are provided herein. According to the method, based on a symptom associated with the device, a first solution is transmitted to a first troubleshooting system. A second solution is transmitted to a second troubleshooting system while tracking the troubleshooting session from the first troubleshooting system. A list of solutions associated with the symptom is automatically updated based on percentage success rates for the solution.

20 Claims, 4 Drawing Sheets

SELF-LEARNING TROUBLESHOOTER

CROSS-REFERENCE TO RELATED APPLICATIONS

This application claims the benefit of U.S. Provisional Application No. 62/511,200 filed May 25, 2017, which is incorporated herein by reference in its entirety.

BACKGROUND OF THE DISCLOSURE

Field of the Disclosure

The embodiments presented herein are generally directed towards a self-learning troubleshooter.

Background

When a customer experiences a problem with a device, the customer typically uses one or more troubleshooting systems (also referred to as "troubleshooting modalities") such as an Interactive Voice Response (IVR) system, a troubleshooting website, a mobile troubleshooting application or a customer service representative. A customer might start the troubleshooting process, for example, on a troubleshooting website and if the problem is not resolved by the troubleshooting website then move on to the IVR system and continue attempting to use different troubleshooting systems until the problem is resolved. Conventional systems do not allow for the customer and troubleshooting data to be replicated across different troubleshooting systems. As a result the same solutions to a problem may be replicated across different troubleshooting systems. In addition, there is a technical problem with sharing data between different troubleshooting systems due to differences in the interfaces. Furthermore, conventional troubleshooting systems do not automatically update an order or list of solutions based on which solution is most likely to solve the problem with the device. Further still, troubleshooting systems do not autonomously gather data from multiple sources such as outage systems, billing systems, and diagnostic systems when attempting to solve a problem with the device. Systems and methods are provided herein to overcome these deficiencies.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor" or "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor. The systems and devices described herein may each include processor or processor circuitry to implement the embodiments presented herein.

Exemplary Troubleshooting System

Figure 1:
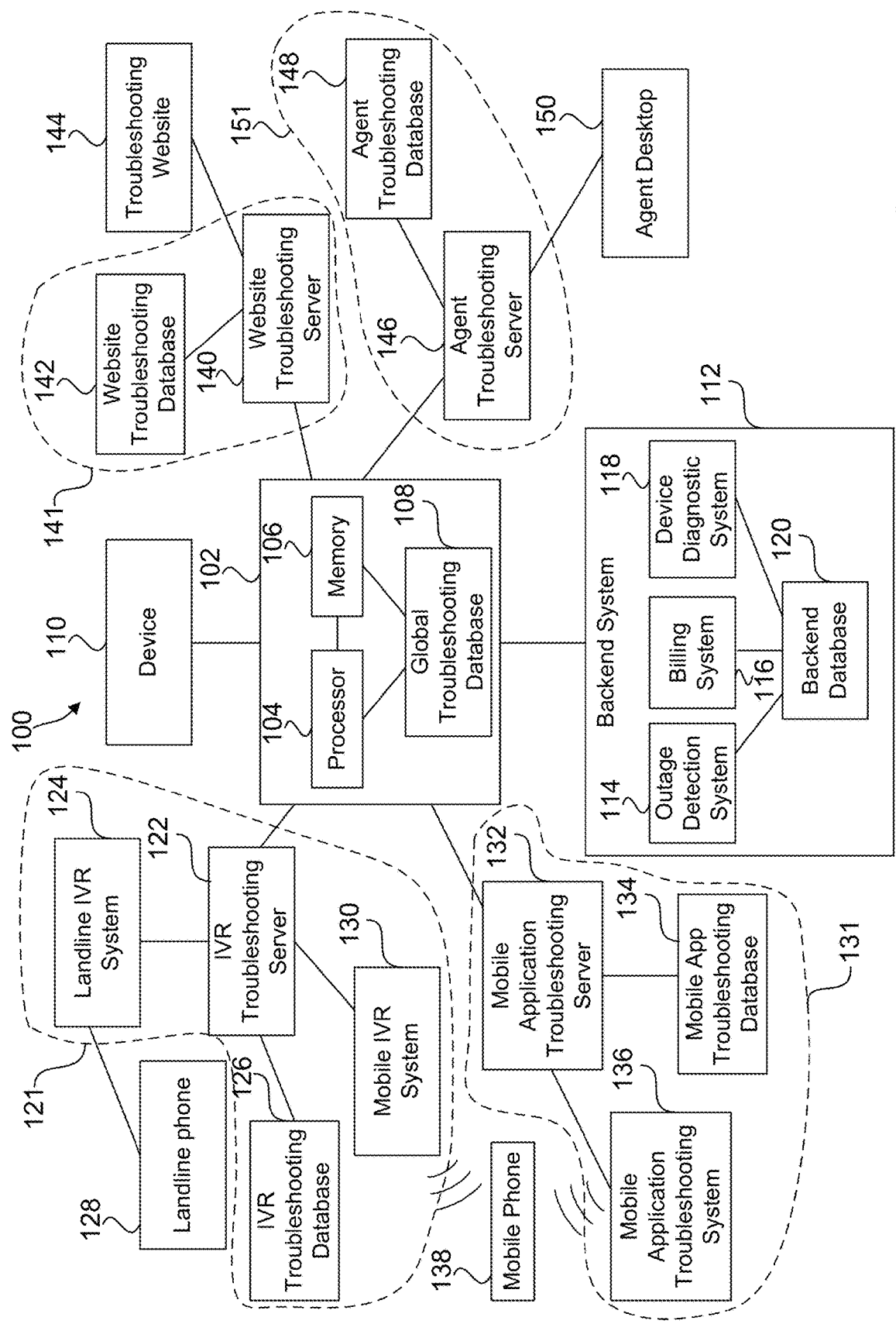
FIG. 1 illustrates an example troubleshooting system according to an embodiment of the disclosure.

FIG. 1 illustrates an example system 100 according to an embodiment of the disclosure. System 100 includes troubleshooting system 102. Troubleshooting system 102 includes a processor 104 coupled to a memory 106 and a global troubleshooting database 108. Troubleshooting system 102 is coupled to device 110, backend system 112, and to multiple troubleshooting systems such as IVR troubleshooting system 121, application troubleshooting system 131, website troubleshooting system 141, and agent troubleshooting system 151. Troubleshooting system 102 may be referred to herein as an "intelligent" or "self-learning" troubleshooting system because it is configured and enabled to gather troubleshooting data from device 110, backend system 112, and one or more troubleshooting systems and select a solution from a list of solutions for a symptom associated with device 110 based on the gathered troubleshooting data. In addition, troubleshooting system 102 is able to dynamically update the list of solutions associated with a particular symptom based on the gathered troubleshooting data. Further still, troubleshooting system 102 is able to update an order of a list of solutions based on data collected on percentage of success of each solution in the list of solutions.

The embodiments presented herein solve a technical solution to a technical problem. For example, a customer may start by using a first type of troubleshooting system such as IVR troubleshooting system 121 to solve a problem experienced by device 110. If the customer is not able to solve the problem associated with device 110 using IVR troubleshooting system 121, the customer might attempt to use website troubleshooting system 141 to solve the problem. However, in conventional systems the customer may have to again input the symptoms exhibited by device 110 in website troubleshooting system 141. Further still, website troubleshooting system 141 will implement, or ask the customer to implement, solutions that have already been attempted using IVR troubleshooting system 121. Thus conventional troubleshooting systems duplicate the process across different troubleshooting systems. By centralizing the troubleshooting process using troubleshooting system 102 and keeping track of the troubleshooting process across different troubleshooting systems, repetition of the troubleshooting process is avoided and the problem is solved faster.

In addition, there is a technical problem in that different troubleshooting systems use different protocols or interfaces and hence are not able to communicate with each other to share troubleshooting data in order to avoid repetition of the troubleshooting process. Troubleshooting system 102 solves the problem by centralizing the troubleshooting process by collecting troubleshooting data from each troubleshooting system, maintaining the troubleshooting data in global troubleshooting database 108, and tracking the use of different troubleshooting systems by a customer.

Further still, there is a technical problem in determining an order of solutions that will most likely solve a problem associated with device 110. Troubleshooting system 102 is able to track a percentage success ratio for each solution that can be used to solve a problem and move the solutions that are most likely to solve the problem to the top of a solution stack. Thus, troubleshooting system 102 creates an optimal order of solutions for each symptom experienced by device 110.

In addition, troubleshooting system 102 is able to dynamically gather data that updates the order of solutions or prevents certain solutions from executing. For example, if a solution calls for rebooting device 102, and based on data gathered from device diagnostic system 118, troubleshooting system 102 may determine that device 110 was recently rebooted. For example if troubleshooting system 102 determines that device 110 was rebooted when a customer accessed IVR troubleshooting system 121, then troubleshooting system 102 may skip the solution of rebooting device 110 when the customer uses website troubleshooting system 121. In another example, troubleshooting system 102 may modify an order of solutions to be implemented based on the type of troubleshooting system in use. For example, if a certain solution can be implemented via agent troubleshooting system 151 (e.g. overriding the billing system) but not via website troubleshooting system 141, then troubleshooting system 102 may present a different order of solutions based on a type of troubleshooting system in use.

Further still, there is the problem of replicating an optimal troubleshooting process across different troubleshooting systems. For example, different customer service agents may use different steps to solve a problem. By using troubleshooting system 102 that centralizes the troubleshooting process, each agent uses the same solutions in the same order when solving a problem experienced by a device 110. Similarly, troubleshooting systems such as IVR troubleshooting system 121 and application troubleshooting system 131 may not use the same order of solutions or may not have an updated optimal order of solutions. By centralizing the process using troubleshooting system 102, there is greater consistency across different troubleshooting systems and more uniformity in the troubleshooting process in addition to avoiding repetition of the troubleshooting process across the different troubleshooting systems.

IVR troubleshooting system 121 includes an IVR troubleshooting server 122 coupled to an IVR troubleshooting database 126, landline IVR system 124, and mobile IVR system 130. Landline IVR system 124 is coupled to landline phone 128 and mobile IVR system 130 is coupled to mobile phone 138. IVR troubleshooting server 122 serves as an interface between mobile IVR system 130, landline IVR system 124, and troubleshooting system 102 to transmit and receive data regarding symptoms associated with a problem experienced by device 110 and solutions associated with the symptom. IVR troubleshooting server 122 stores and retrieves troubleshooting data from IVR troubleshooting database 126. Landline IVR system 124 serves as the interface to landline phone 128. Mobile IVR system serves as the interface to mobile phone 138.

Application troubleshooting system 131 includes mobile application troubleshooting server 132 that is coupled to mobile application troubleshooting database 134, and mobile application troubleshooting system 136. Mobile application troubleshooting system 136 is coupled to mobile phone 138. Mobile application troubleshooting server serves as the interface between troubleshooting system 102, and the mobile application troubleshooting system 136 to transmit and receive data regarding symptoms associated with a problem experienced by device 110 and solutions associated with the symptom. Mobile application troubleshooting server 132 stores and retrieves troubleshooting data from mobile troubleshooting database 134. Mobile application troubleshooting system 136 provides an interface to mobile phone 138. Mobile phone 138 may run a troubleshooting application that interfaces with mobile application troubleshooting system 136.

Website troubleshooting system 141 includes a website troubleshooting server 140 that is coupled to website troubleshooting database 142. Website troubleshooting server 140 hosts troubleshooting website 144. Website troubleshooting server 140 serves as an interface between troubleshooting system 102 and to troubleshooting website 144. Website troubleshooting server 140 stores and retrieves troubleshooting data from website troubleshooting database 142.

Agent troubleshooting system 151 includes an agent troubleshooting server 146 coupled to an agent troubleshooting database 148. Agent troubleshooting server 146 is coupled to an agent desktop 150. Agent troubleshooting server 146 serves as an interface to troubleshooting system 102 and agent desktop 150. Agent troubleshooting server stores and retrieves troubleshooting data from agent troubleshooting database 148.

It is to be appreciated that the various couplings shown in FIG. 1 may be wired or wireless and based on any type of wired or wireless network.

Exemplary Operation of the Exemplary Troubleshooting System

The detailed description to follow describes some exemplary operations of an exemplary troubleshooting system, such as the troubleshooting system 102 to provide an example. Those skilled in the relevant art(s) will recognize other operations or combinations of operations are possible without departing from the spirit and scope of the present disclosure.

In an example, a customer may be experiencing a problem with device 110. Device 110 may be any type of device, e.g., a set-top box or a digital video recorder (DVR). The problem experienced by device 110 may manifest itself as a particular symptom that is being experienced by device 110. For example, device 110 may be a set-top box that is coupled to a television. The set-top box may display four dashes and may not be operational because the customer failed to pay their bill on time and service to the set-top box has been terminated. Here, the problem is the termination of the service and the symptom is the four dashes on the set-top box display. In another example, the television coupled to device 110 may be experiencing pixelation in the image displayed because one of the cables connected to the set-top box is loose. Here, the loose connection is the problem and the pixelation is the symptom associated with the problem. In order to solve the problem associated with device 110, a customer may access one or more of the multiple troubleshooting systems until the problem has solved.

For example, upon experiencing a problem associated with device 110, the customer may first attempt to call IVR system 121 either via landline phone 128 or mobile phone 138. If the customer accesses IVR system 121 through landline phone 128, then the call is routed through landline IVR system 124. If the customer accesses IVR system 121 via mobile phone 138, then the call is routed through mobile IVR system 130. Landline IVR system 124 or mobile IVR system 130 may provide a set of prompts to the customer to elicit a response regarding the problem associated with device 110 and any associated symptoms. For the purposes of this example, it is assumed the customer uses mobile phone 138 to access mobile IVR system 130. Based on the customer's input, the symptom associated with device 110 is received by mobile IVR system 130. The symptom may be stored in troubleshooting database 126 by IVR troubleshooting server 122. IVR troubleshooting server 122 transmits the symptom associated with device 110 to troubleshooting system 102. In an example, troubleshooting system 102 may retrieve the symptom associated with device 110 by accessing IVR troubleshooting database 126 via IVR troubleshooting server 122.

Upon receiving one or more symptoms from IVR troubleshooting system 121, troubleshooting system 102 may poll device 110 to collect system information associated with device 110. For example, information such as device type, device configuration, device firmware version, signal levels to and from the device 110, and a last reboot of the device may be collected. Troubleshooting system 102 also accesses backend system 112 to collect data from outage detection system 114, billing system 116, and device diagnostic system 118. Data associated with outage detection system 114, billing system 116, and device diagnostic system 118 may be stored in backend database 120.

In an example, outage detection system 114 determines whether an area where device 110 is located is experiencing an outage such as a power outage or an outage for a service, such as cable television or Internet service provided to device 110. For example, outage detection system 114, based on data stored in billing system 116 that includes a physical address or Internet Protocol (IP) address of device 110 may determine whether a particular area where device 110 is located is experiencing an outage. In another example, outage detection system 114 may detect an outage by sending a signal such as a ping to a node (not shown) that device 110 is connected to in order to determine whether that particular node is experiencing an outage. In a further example, outage detection system 114 may check a certain number of devices proximate to a physical location of device 110 or serviced by a same node as device 110 to determine if these devices are experiencing an outage.

Data from billing system 116 may be accessed by troubleshooting system 102 to determine whether an account associated with device 110 is active and payments have been made. Device diagnostic system 118 may run a set of diagnostics by sending one or more of signals or commands to device 110 to determine a problem associated with device 110. Troubleshooting data collected from outage detection system 114, billing system 116, device diagnostic system 118, and backend database 120 may be stored in global troubleshooting database 108. In an example, the troubleshooting data may be stored in a global form in global troubleshooting database 108 that includes a troubleshooting identification (ID) that is associated with device 110 and/or a customer account ID or device ID associated with device 110. An example of the data in a sample global form is shown below in Table 1.

TABLE 1

| Troubleshooting ID | Troubleshooting session Active | Device ID | Customer ID | Customer phone number | Symptom experienced | Device IP address | Billing Information | Outage information | Diagnostic Information | Solutions implemented | Troubleshooting system accessed |
|---|---|---|---|---|---|---|---|---|---|---|---|
| 2454 | Yes | STB 110 | 3334 | 123-456-7899 | Pixelation on TV screen | 172.467.1223 | Paid | No Outage | Software up-to date | Remote Reboot<br><br>Check Connections<br>. . . | Mobile IVR |

Based on the data received from IVR troubleshooting database 126 such as the symptom associated with device 110, the data received from device 110, and from backend system 112, troubleshooting system 102 determines a solution from a list of solutions associated with the symptom. An example of a list of solutions associated with a symptom is shown below in Table 2.

TABLE 2

| Symptom | Solutions |
|---|---|
| Pixelation | Check connections<br>Reboot device<br>Send a box hit<br>. . . |

As seen in Table 2, for the symptom of pixelation, troubleshooting system 102 will select a first solution in the list of solutions which is "check connections." The first solution is then transmitted via IVR troubleshooting server 122 to mobile IVR system 130. In another example, troubleshooting system 102 may autonomously implement the solution. For example, troubleshooting system 102 may send a signal to device 110 that automatically checks connections. If the first solution does not work to resolve the problem associated with device 110, then troubleshooting system 102 selects and transmits the next solution in the list of solutions to IVR troubleshooting system 121. For example, troubleshooting system 102 will transmit the solution of "reboot device" to IVR troubleshooting server 122 which in turn will relay the solution to mobile IVR system

130. Mobile IVR system 130 will prompt the customer via mobile phone 138 to reboot the device 110. In an example, troubleshooting system 102 may reboot the device automatically by sending a signal or command to device 110.

In another example, if the first solution of "check connections" does not work to resolve the problem associated with device 110, the customer may decide to use a different type of troubleshooting system. For example, the customer may attempt to access application troubleshooting system 131 using an application running on mobile phone 138. When the customer accesses application troubleshooting system 131, the request is routed through mobile application troubleshooting system 136 to mobile application troubleshooting server 132. Mobile application troubleshooting server 132 sends the troubleshooting request to troubleshooting system 102. Troubleshooting system 102 may, for example, based on the mobile phone number associated with the customer's profile, associate the troubleshooting ID stored in the global form in Table 1 with the troubleshooting session started by the customer using IVR troubleshooting system 121. In another example, the customer enters their customer ID using their mobile phone keypad as part of the troubleshooting process with IVR troubleshooting system 121. The customer ID was associated with the troubleshooting ID in Table 1 when the user was using IVR troubleshooting system 121. When the customer accesses application troubleshooting system 131, the customer may be prompted by application troubleshooting system 131 to again enter their customer ID. Based on their customer ID, troubleshooting system 102 may search for the global form in Table 1 in global troubleshooting database 108. Troubleshooting system 102 may determine whether the troubleshooting ID associated with the customer ID is active (i.e. the problem was not resolved by the prior troubleshooting system used by the customer) and continues the troubleshooting process where the user left off with IVR troubleshooting system 121. Thus, troubleshooting system 102 can track a troubleshooting request associated with a device 110 across different troubleshooting systems. As a result, solutions that were implemented via a first troubleshooting system that was previously accessed by the customer are not repeated when the customer uses a second troubleshooting system. Furthermore, troubleshooting data collected by a first troubleshooting system is replicated for a second troubleshooting system. For example, troubleshooting system 102 accesses the global form from Table 1 in global troubleshooting database 108 which already has data on the device 110, data from backend troubleshooting system 112, and data from IVR troubleshooting database 126 that includes the symptom experienced by device 110 and any solutions that have been implemented using IVR troubleshooting system 121.

Based on the data in global troubleshooting database 108, and the type of troubleshooting system that is being used by a customer, troubleshooting system 102 determines a next solution to solve the problem being experience by device 110. For example, if the check connections solution from Table 2 has been implemented, then troubleshooting system 102 will implement the next solution of "reboot device." The solution of "reboot device" is transmitted to mobile application troubleshooting server 132, which then sends the solution to mobile application troubleshooting system 136 to convey to mobile phone 138. Any symptoms that are further input via mobile phone 138 are received by mobile troubleshooting system 136, relayed to mobile application troubleshooting server 132, are stored in mobile application troubleshooting database 134, and transmitted to troubleshooting system 102 for storage in the global form in Table 1. Thus troubleshooting system 102 keeps track of the symptom associated with device 110 and any solutions that have been implemented via different troubleshooting systems, such as IVR troubleshooting system 121 and application troubleshooting system 131.

In an example, the customer may further access website troubleshooting system 141 if using application troubleshooting system 131 does not solve the problem associated with device 110. For example, the customer may access website troubleshooting system 141 using troubleshooting website 144 that is hosted by website troubleshooting server 140. Upon receiving input from troubleshooting website 144, troubleshooting system 102 may determine the troubleshooting ID that is associated with device 110 or the customer's previous troubleshooting session based on, either a login and password entered by the customer associated with device 110, customer ID entered by the customer, or an Internet Protocol (IP) address that is associated with the customer using troubleshooting website 144. Thus, troubleshooting system 102 continues to track the same troubleshooting session across different troubleshooting systems. Based on the symptom and the data collected from other troubleshooting systems used by the customer, troubleshooting system 102 determines a next solution in Table 2 to solve the problem associated with device 110. The next solution is then transmitted to website troubleshooting server 140 which transmits the solution to troubleshooting website 144.

In another example, troubleshooting system 102 may autonomously based on symptoms and previous solutions implemented attempt to solve the problem, for example by attempting to reboot device 110 remotely or reconfiguring the software on device 110, or sending a box hit to device 110. A box hit as described herein refers to an authorization signal or command sent by, for example, processor 104, or a cable modem termination system (CMTS) headend (not shown) when prompted by processor 104, that enables or disables a service to device 110. For example, the customer may be experiencing pixelation issues with a particular subscription-based cable television channel such as HBO' because it may have been disabled by the CMTS headend. By sending the box hit to device 110 the service to the particular cable television channel may be restored and the pixelation issue may be resolved. Troubleshooting system 102 will collect the data input through troubleshooting website 144 regarding any further symptoms and also collect data regarding any solutions that were implemented by the customer using website troubleshooting system 141. The collected information may also be stored in website troubleshooting database 142.

If the problem associated with device 110 is still not solved, the customer may attempt to use agent troubleshooting system 151. The customer service agent uses an agent desktop 150 that is coupled to agent troubleshooting server 146. Agent troubleshooting server 146 receives the data that is input by the customer service agent using agent desktop 150. Troubleshooting system 102 may track the troubleshooting ID associated with device 110 based on either an automatic detection of the phone number used by the customer to contact the agent or via input of a customer ID number by the agent using agent desktop 150. After locating the troubleshooting ID and the global form in Table 1 associated with the customer's troubleshooting session, troubleshooting system 102 determines a next solution for the problem from Table 2 and transmits the solution to agent desktop 150 via agent troubleshooting server 146. The symptoms and solutions associated with agent troubleshooting system 151 may be stored in agent troubleshooting database 148 and used to update the global form in Table 1.

Once the problem associated with device 110 is solved, according to an embodiment, troubleshooting system 102 determines which solution in the list of solutions solved the problems. Over a period of time, troubleshooting system 102 stores data on a rate of success for solutions associated with a symptom. Troubleshooting system 102 then updates the list of solutions associated with a symptom based on a percentage success rate of the solutions. For example, Table 3 below shows tracking of a percentage success for the solutions shown in Table 2.

TABLE 3

| Symptom | Solution stack | Percentage success |
|---|---|---|
| Pixelation | Check connections | 22% |
| | Reboot device | 25% |
| | Send a box hit | 8% |
| | . . . | . . . |

In the example, in Table 3, the solution of rebooting the device has a greater percentage of success than the check connections solution. Therefore troubleshooting system 102 will update the list of solutions in Table 3 to place reboot device before check connections in the order of solutions as shown below in Table 4.

TABLE 4

| Symptom | Solution stack | Percentage success |
|---|---|---|
| Pixelation | Reboot device | 25% |
| | Check connections | 22% |
| | Send a box hit | 8% |
| | . . . | . . . |

Thus, troubleshooting system 102 based on empirical data self-learns and optimizes a list of solutions for each symptom. Another example of a symptom, a list of solutions, and percentage success rates is shown below in Table 5.

TABLE 5

| Symptom | Solution stack | Percentage success |
|---|---|---|
| Four dashes on display | Billing inquiry | 44% |
| | Send a box hit | 29% |
| | Check connections | 20% |
| | . . . | . . . |

In the example above, if a display for device 110 is showing four dashes, a billing inquiry to determine whether the customer's account payments are up to date yields the highest success rate to solve the problem followed by "send a box hit" and "check connections" solution.

Figure 2:
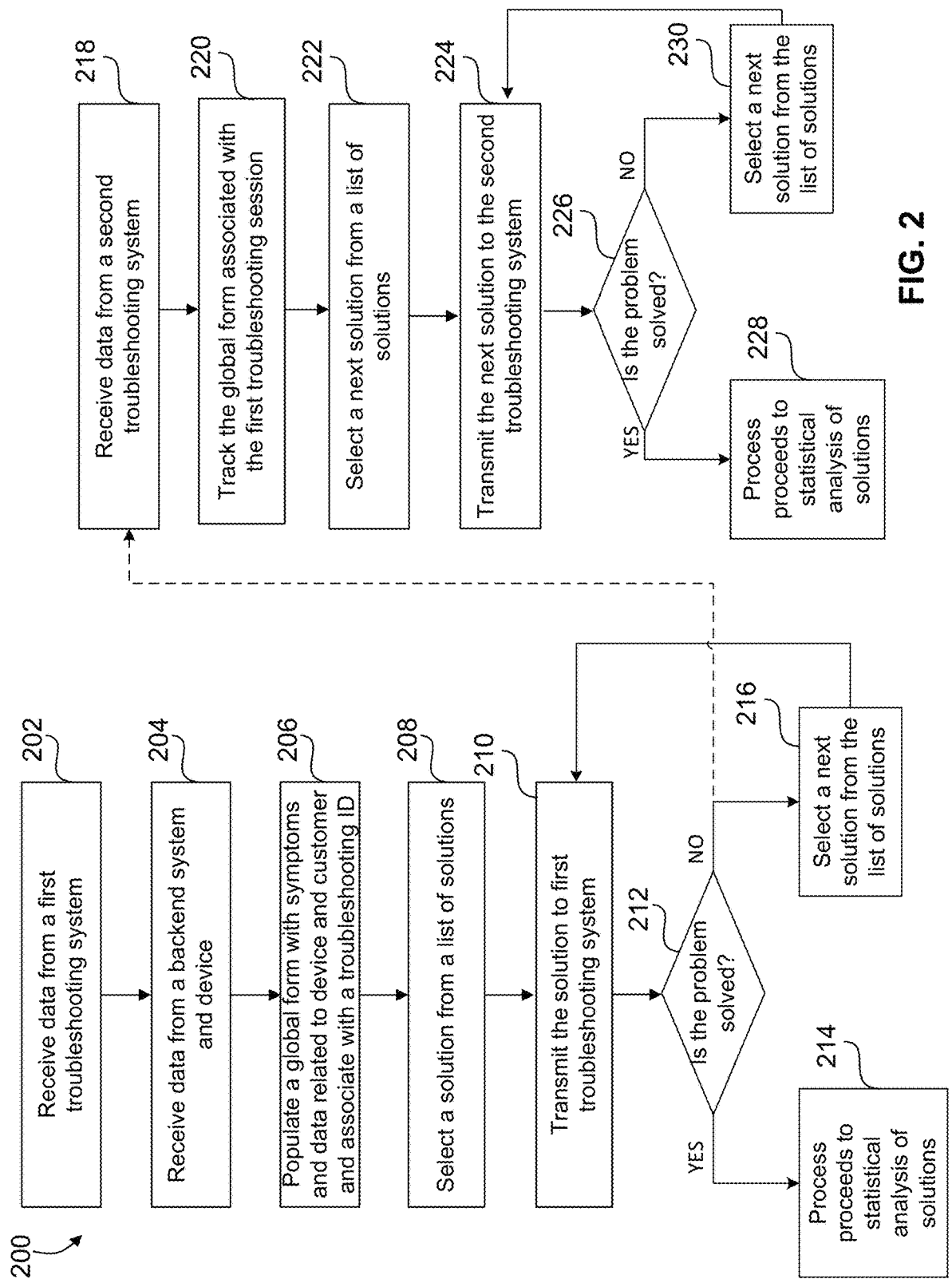
FIG. 2 illustrates an example flowchart illustrating steps to solve a problem associated with a device according to an embodiment of the disclosure.

FIG. 2 illustrates an example flowchart 200 illustrating steps to solve a problem associated with device 110 according to an embodiment of the disclosure. The steps in flowchart 200 may be performed by troubleshooting system 102, for example by a processor 104 based on instructions stored in memory 106. It is to be appreciated that the steps may be performed in a different order than shown in flowchart 200.

In step 202, data is received from a first troubleshooting system. For example, troubleshooting system 102 may receive data from website troubleshooting system 141. The data may be, for example, a symptom that is associated with device 110 that is experiencing a problem.

In step 204, data is received from a backend system and from the device experiencing the problem. For example, troubleshooting system 102 accesses data from outage detection system 114, billing system 116, device diagnostic system 118, and backend database 120. Troubleshooting system 102 may also access device 110 to collect data from device 110.

In step 206, a global database is populated with the symptom associated with the device along with data collected in step 204. For example, a global form such as in Table 1 is populated with the data and is associated with a troubleshooting ID.

In step 208, based on the data received and populated in the global database in step 206, a solution is selected from a list of solutions based on the symptom. For example, troubleshooting system 102, based on the symptom and the data populated in step 206, determines a solution from the list of solutions. For example, for the symptom of pixelation, troubleshooting system 102 selects a first solution of check connections from Table 2.

In step 210, the solution is transmitted to the first troubleshooting system. For example, troubleshooting system 102 transmits the solution selected in step 208 to website troubleshooting server 140. Website troubleshooting server 140 then transmits the solution to troubleshooting website 144. In another example, troubleshooting system 102 implements the solutions itself, for example, by sending a signal to device 110 to automatically check connections.

In step 212, it is determined whether the problem associated with the device is solved. For example, a customer may be prompted via troubleshooting website 144 whether the problem is solved or troubleshooting system 102 may autonomously send a signal to device 110 to determine whether the problem has been solved.

If it is determined that the problem is not solved then the process proceeds to step 216 and if the problem is solved then the process proceeds to step 214. In step 214, a statistical analysis of the solution is conducted using, for example, the process in FIG. 3.

In an example, if the problem is not solved, then in step 216, a next solution from the list of solutions is selected from Table 2 and the process proceeds to step 210 where the next solution is transmitted to the first troubleshooting system. Alternatively, if the customer decides to access a different troubleshooting system to solve the problem then the process proceeds to step 218.

In step 218, data regarding the problem is received from a second troubleshooting system. For example, troubleshooting 102 may receive data from agent troubleshooting system 151.

In step 220, the global form associated with the first troubleshooting system is located based on, for example, the troubleshooting ID, customer ID, mobile phone number associated with the customer, or IP address associated with the customer.

In step 222, a next solution is selected from the list of solutions. For example, troubleshooting system 102, based on the data in the global form that tracks the symptom and the solutions that have been implemented so far, selects a next solution from the list of solutions in Table 2.

In step 224, the next solution is transmitted to the second troubleshooting system. For example, troubleshooting system 102 transmits the next solution to the agent troubleshooting server, which in turn transmits the solution to agent desktop 150.

In step 226, it is determined whether the problem associated with the device is solved. For example, the agent using agent desktop 150 may input data indicating the problem has been solved.

If it is determined that the problem is solved, then the process proceeds to step 228 and if not then the process proceeds to step 230. In step 230, if the problem is not yet solved, then a next solution from the list of solutions is selected and transmitted to the second troubleshooting system. For example, a next solution from the list of solutions in Table 2 is selected and transmitted via agent troubleshooting server 146 to agent desktop 150.

Figure 3:
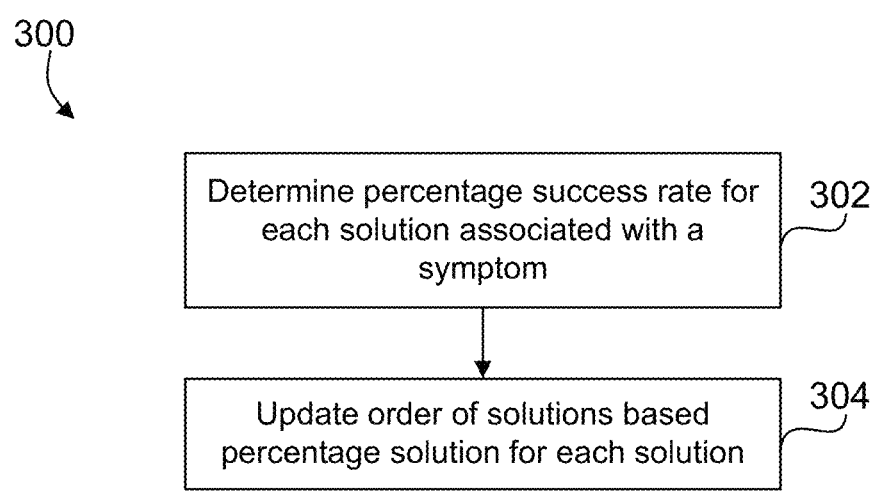
FIG. 3 illustrates an example flowchart illustrating the steps to conduct a statistical analysis of solutions associated with a symptom according to an embodiment of the disclosure.

If the problem is solved, then in step 228, a statistical analysis of the solution is conducted using, for example, the process in FIG. 3.

FIG. 3 illustrates an example flowchart 300 illustrating the steps to conduct a statistical analysis of solutions associated with a symptom according to an embodiment of the disclosure. The steps in flowchart 300 may be performed by troubleshooting system 102, for example by a processor 104 based on instructions stored in memory 106. It is to be appreciated that the steps may be performed in a different order than shown in flowchart 300.

In step 302, a percentage success rate for each solution associated with a symptom is determined. For example, troubleshooting system 102 determines a percentage success rate for each solution based on data collected over a period of time on whether the solution was successful as shown in Table 3.

In step 304, an order of solutions is updated based on whether the percentage success rate passes a certain threshold. For example, if a solution is more successful than a next solution then it is moved up in the list of solutions or in the order of the solutions as shown in Table 4.

Figure 4:
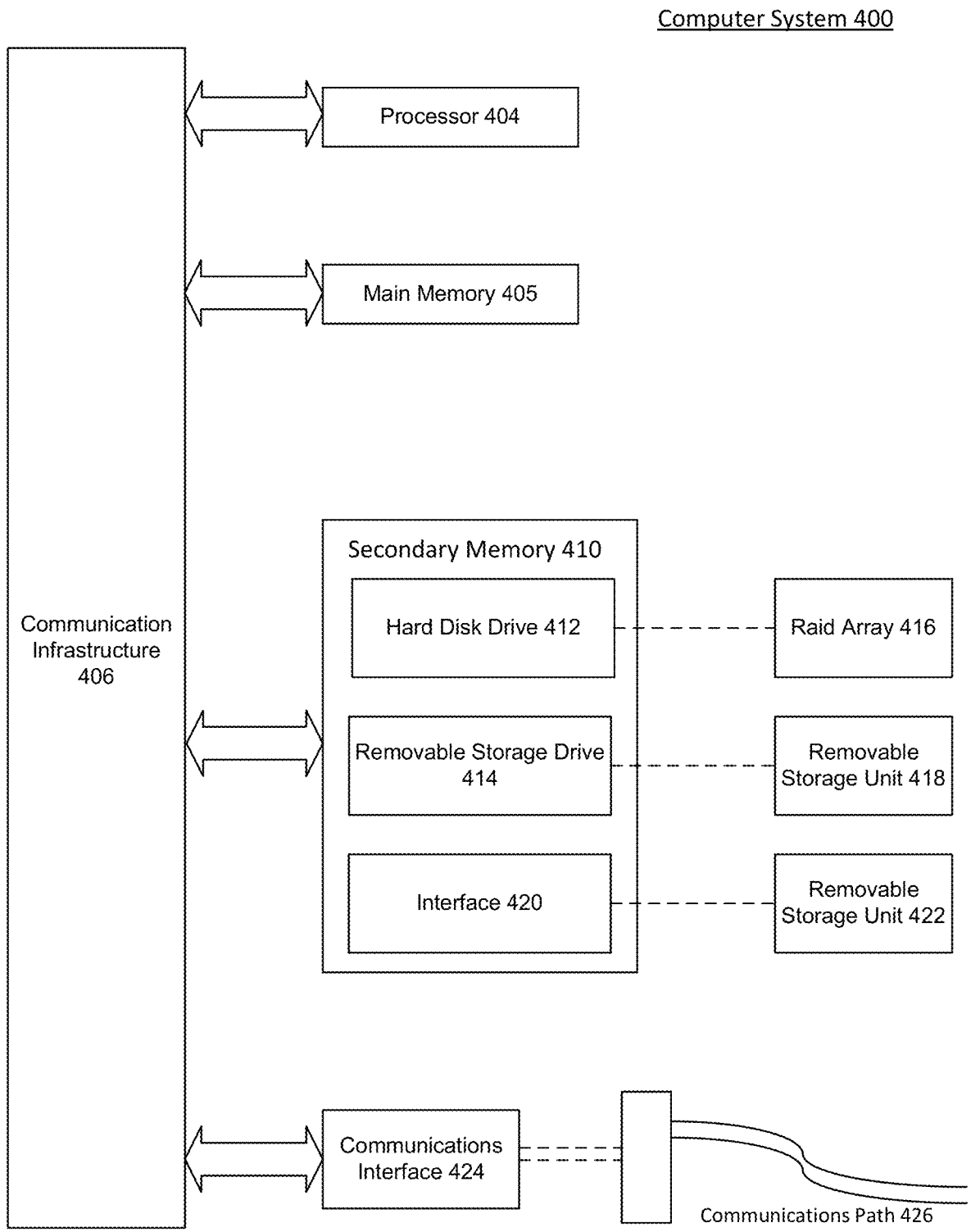
FIG. 4 illustrates an example computer system to implement embodiments disclosed herein.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 400 is shown in FIG. 4. The computer system 400 includes one or more processors, such as processor 404. Processor 404 can be a special purpose or a general-purpose digital signal processor. Processor 404 may be, for example, processor 104 (as described in FIG. 1). The processor 404 is connected to a communication infrastructure 406 (for example, a bus or network). Various software implementations are described in terms of this exemplary computer system. After reading this description, it will become apparent to a person skilled in the relevant art how to implement the disclosure using other computer systems and/or computer architectures.

Computer system 400 also includes a main memory 405, preferably random access memory (RAM), and may also include a secondary memory 410. The secondary memory 410 may include, for example, a hard disk drive 412, and/or a RAID array 416, and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418 represents a floppy disk, magnetic tape, optical disk, etc. As will be appreciated, the removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software (i.e., instructions) and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc., that are coupled to a communications path 426. The communications path 426 can be implemented using wire or cable, fiber optics, a phone line, a cellular phone link, an RF link and other communications links or channels.

The terms "computer program medium" and "computer usable medium" are used herein to generally refer to media such as removable storage drive 414, a hard disk installed in hard disk drive 412, or other hardware type memory. These computer program products are means for providing or storing software (e.g. instructions) to computer system 400.

Computer programs (also called computer control logic) are stored in main memory 405 and/or secondary memory 410. Computer programs may also be received via communications interface 424. Such computer programs, when executed, enable the computer system 400 to implement the present disclosure as discussed herein. In particular, the computer programs, when executed, enable the processor 404 to implement the processes and/or functions of the present disclosure. For example, when executed, the computer programs enable processor 404 to implement part of or all of the steps described herein. Where the disclosure is implemented using software, the software may be stored in a computer program product and loaded into computer system 400 using raid array 416, removable storage drive 414, hard drive 412 or communications interface 424.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A system for troubleshooting a problem with a device, comprising:
   a memory;
   a processor coupled to the memory and based on instructions stored in the memory, configured to:
      receive a symptom associated with the device from a first troubleshooting system accessed by a customer;
      connect with the device to receive data from the device;
      interface with a backend system to collect data pertaining to the device including device diagnostic data, outage data, and billing data;
      populate a global form with the symptom, the data from the device, the device diagnostic data, the outage data, and the billing data;
      select a first solution from a list of solutions associated with the symptom based on the global form;
      transmit the first solution to the first troubleshooting system;
      populate the global form with the first solution;
      interface with a second troubleshooting system when the customer accesses the second troubleshooting system;
      select a second solution from the list of solutions based on the symptom, the global form, and the first solution; and
      transmit the second solution to the second troubleshooting system.

2. The system of claim 1, wherein the first troubleshooting system or the second troubleshooting system are one of a troubleshooting website, an interactive voice recording (IVR) troubleshooting system, a troubleshooting mobile application, or a customer service troubleshooting terminal.

3. The system of claim 1, wherein the backend system includes one or more of an outage detection system, a billing system, and a device diagnostic system.

4. The system of claim 1, wherein the data from the device includes data regarding device type, device configuration, device firmware version, signal levels to and from the device, and a last reboot of the device.

5. The system of claim 1, wherein a troubleshooting identification (ID) is associated with the device and the global form, and wherein the processor is configured to use the troubleshooting ID to track use of the first troubleshooting system and the second troubleshooting system.

6. The system of claim 1, wherein the processor is further configured to collect a percentage success rate for each solution in the list of solutions associated with the symptom and re-order the list of solutions based on the percentage success rate.

7. The system of claim 1, wherein the processor is further configured to change an order of solutions in the list of solutions based on a type of troubleshooting system accessed by the customer.

8. A method for troubleshooting a problem with a device, comprising:
   receiving a symptom associated with the device from a first troubleshooting system accessed by a customer;
   connecting with the device to receive data from the device;
   interfacing with a backend system to collect data pertaining to the device including device diagnostic data, outage data, and billing data;
   populating a global form with the symptom, the data from the device, the device diagnostic data, the outage data, and the billing data;

selecting a first solution from a list of solutions associated with the symptom based on the global form;

transmitting the first solution to the first troubleshooting system;

populating the global form with the first solution;

interfacing with a second troubleshooting system when the customer accesses the second troubleshooting system;

selecting a second solution from the list of solutions based on the symptom, the global form, and the first solution; and transmitting the second solution to the second troubleshooting system.

9. The method of claim 8, wherein the first troubleshooting system or the second troubleshooting system are one of a troubleshooting website, an interactive voice recording (IVR) troubleshooting system, a troubleshooting mobile application, or a customer service troubleshooting terminal.

10. The method of claim 8, wherein the backend system includes one or more of an outage detection system, a billing system, and a device diagnostic system.

11. The method of claim 8, wherein the data from the device includes data regarding device type, device configuration, device firmware version, signal levels to and from the device, and a last reboot of the device.

12. The method of claim 8, wherein a troubleshooting identification (ID) is associated with the device and the global form, and wherein the method further comprises using the troubleshooting ID to track use of the first troubleshooting system and the second troubleshooting system.

13. The method of claim 8, further comprising collecting a percentage success rate for each solution in the list of solutions associated with the symptom and re-ordering the list of solutions based on the percentage success rate.

14. The method of claim 8, further comprising changing an order of solutions in the list of solutions based on a type of troubleshooting system accessed by the customer.

15. A non-transitory computer-readable medium having stored thereon computer executable instructions that, if executed by a computing device, cause the computing device to perform a method to troubleshoot a problem with a device, comprising:

receiving a symptom associated with the device from a first troubleshooting system accessed by a customer;

connecting with the device to receive data from the device;

interfacing with a backend system to collect data pertaining to the device including device diagnostic data, outage data, and billing data;

populating a global form with the symptom, the data from the device, the device diagnostic data, the outage data, and the billing data;

selecting a first solution from a list of solutions associated with the symptom based on the global form;

transmitting the first solution to the first troubleshooting system;

populating the global form with the first solution;

interfacing with a second troubleshooting system when the customer accesses the second troubleshooting system;

selecting a second solution from the list of solutions based on the symptom, the global form, and the first solution; and transmitting the second solution to the second troubleshooting system.

16. The non-transitory computer-readable medium of claim 15, wherein the first troubleshooting system or the second troubleshooting system are one of a troubleshooting website, an interactive voice recording (IVR) troubleshooting system, a troubleshooting mobile application, or a customer service troubleshooting terminal.

17. The non-transitory computer-readable medium of claim 15, wherein the backend system includes one or more of an outage detection system, a billing system, and a device diagnostic system.

18. The non-transitory computer-readable medium of claim 15, wherein the data from the device includes data regarding device type, device configuration, device firmware version, signal levels to and from the device, and a last reboot of the device.

19. The non-transitory computer-readable medium of claim 15, wherein a troubleshooting identification (ID) is associated with the device and the global form, and wherein the method further comprises using the troubleshooting ID to track use of the first troubleshooting system and the second troubleshooting system.

20. The non-transitory computer-readable medium of claim 15, the method further comprising collecting a percentage success rate for each solution in the list of solutions associated with the symptom and re-ordering the list of solutions based on the percentage success rate.

* * * * *